United States Patent
Fechner et al.

(10) Patent No.: US 10,349,004 B2
(45) Date of Patent: Jul. 9, 2019

(54) METHOD FOR SAVING IMAGE DATA OF A CAMERA IN AN ACCIDENT DATA RECORDER OF A VEHICLE

(71) Applicant: Conti Temic microelectronic GmbH, Nuremberg (DE)

(72) Inventors: Thomas Fechner, Wasserburg (DE); Dieter Kroekel, Eriskirch (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 103 days.

(21) Appl. No.: 15/121,456

(22) PCT Filed: Feb. 3, 2015

(86) PCT No.: PCT/DE2015/200056
§ 371 (c)(1),
(2) Date: Aug. 25, 2016

(87) PCT Pub. No.: WO2015/139693
PCT Pub. Date: Sep. 24, 2015

(65) Prior Publication Data
US 2016/0366364 A1 Dec. 15, 2016

(30) Foreign Application Priority Data
Mar. 19, 2014 (DE) .................. 10 2014 205 053

(51) Int. Cl.
*H04N 5/917* (2006.01)
*H04N 7/18* (2006.01)
(Continued)

(52) U.S. Cl.
CPC ......... *H04N 5/917* (2013.01); *G06K 9/00805* (2013.01); *G07C 5/0866* (2013.01);
(Continued)

(58) Field of Classification Search
None
See application file for complete search history.

(56) References Cited

U.S. PATENT DOCUMENTS

| 7,161,616 | B1* | 1/2007 | Okamoto | B60R 1/00 348/148 |
| 9,524,269 | B1* | 12/2016 | Brinkmann | G06F 17/00 |
| 2009/0268947 | A1* | 10/2009 | Schaufler | G06K 9/00805 382/104 |

FOREIGN PATENT DOCUMENTS

| DE | 42 21 280 | 3/1995 |
| DE | 199 52 832 | 5/2000 |

(Continued)

OTHER PUBLICATIONS

International Search Report of the International Searching Authority for International Application PCT/DE2015/200056, dated Jul. 16, 2015, 2 pages, European Patent Office, HV Rijswijk, Netherlands.
(Continued)

*Primary Examiner* — Christopher Braniff
(74) *Attorney, Agent, or Firm* — W. F. Fasse

(57) ABSTRACT

A method of saving image data of a camera in an accident data recorder of a vehicle involves: a) performing object recognition to determine object data regarding objects detected from the camera image data; b) compressing the camera image data by a lossy compression method to form compressed image data; c) storing the object data and the compressed image data in a storage unit; d) overwriting the data in the storage unit after a predefined volume of data has been stored; and e) statically saving the object data and the compressed image data in response to a trigger signal.

14 Claims, 1 Drawing Sheet

(51) Int. Cl.
    *H04N 5/77*     (2006.01)
    *G06K 9/00*     (2006.01)
    *H04N 5/907*     (2006.01)
    *G07C 5/08*     (2006.01)

(52) U.S. Cl.
    CPC ............. *H04N 5/772* (2013.01); *H04N 5/907* (2013.01); *H04N 7/188* (2013.01)

(56) References Cited

FOREIGN PATENT DOCUMENTS

| | | | |
|---|---|---|---|
| DE | 19952832 | * | 5/2000 |
| DE | 199 39 468 | | 2/2001 |
| DE | 202 12 698 | U1 | 11/2002 |
| EP | 2 104 076 | | 9/2009 |
| EP | 2104076 | * | 9/2009 |
| JP | 2003-002256 | A | 1/2003 |
| JP | 2006-067172 | A | 3/2006 |
| JP | 2009-093255 | A | 4/2009 |
| JP | 2010-273178 | A | 12/2010 |
| JP | 2011-096063 | A | 5/2011 |

OTHER PUBLICATIONS

PCT International Preliminary Report on Patentability including English Translation of PCT Written Opinion of the International Searching Authority for International Application PCT/DE2015/200056, dated Sep. 20, 2016, 6 pages, International Bureau of WIPO, Geneva, Switzerland.

German Office Action in German Patent Application No. 10 2014 205 053.7, dated Oct. 24, 2014, 8 pages, with partial English translation, 4 pages.

"Verlustbehaftete Komprimierung" ("Lossy Compression"), "Unterricht" ("Lesson"), Bildungsserver Berlin-Brandenburg ("Education Server Berlin-Brandenburg"), 2013, pp. 1-2, https://web.archive.org/web/20131229066616/http://bildungsserver.berlin-brandenburg.de/verlust_komp.html archived at http://www.archive.org on Dec. 29, 2013, accessed on Oct. 24, 2014.

Partial English translation of Japanese Office Action dated Dec. 18, 2018 and issued Dec. 26, 2018 in Japanese Patent Application No. 2016-553304, 1 page.

Partial English translation of Japanese Office Action dated May 14, 2018 and issued May 16, 2018 in Japanese Patent Application No. 2016-553304, 2 pages.

* cited by examiner

METHOD FOR SAVING IMAGE DATA OF A CAMERA IN AN ACCIDENT DATA RECORDER OF A VEHICLE

FIELD OF THE INVENTION

The invention relates to a method for saving image data of a camera in an accident data recorder of a vehicle. Furthermore, the invention also relates to an accident data recorder for performing the method according to the invention.

BACKGROUND INFORMATION

Accident data recorders are known from prior art. Thus for example DE 42 21 280 C2 describes an accident data recorder with a ring memory, in which the image data produced by an imaging camera are saved. On the occurrence of a triggering event data stops being saved in the ring memory after a specified period so that it can be read to evaluate the details of an accident. In addition to the image data, other data relevant to the reconstruction of the details of the accident are also saved, such as the driving parameters, the vehicle operating status data and driver status data.

Furthermore, from DE 199 39 468 A1 a method is known for controlling the recording activity of an accident data recorder in motor vehicles. In this method to control the recording activity of the accident data recorder safety systems provided in the vehicle are taken into consideration, in that the video signal is analyzed and evaluated according to a predefined schema and/or an evaluation signal is produced. The evaluation signal is used to determine a time period for the recording activity of the accident data recorder by means of a characteristic map. Thus data are used from a safety system of the vehicle which have been obtained in connection with road recognition, dynamic steering support, object recognition, road sign recognition, or an automatic headlight control. Internal vehicle data, such as an airbag signal, vehicle speed, a braking signal, a driving direction signal, an acceleration signal, or a motor position signal enter into the generation of the characteristic map for determining the time period of recording activity.

The recording of data also includes data about the position of the vehicle, such as the road width, road curvature, a lateral position of the vehicle relative to the lane edges, a yaw angle, a pitch angle, and a roll angle of the vehicle. Furthermore, such data can also relate to the surroundings of the vehicle, such as road signs, road condition, position, size, distance, and relative speed of other objects, for example cars, pedestrians, and motorbikes.

A disadvantage of these known methods is that a large storage capacity is needed to carry out said methods.

SUMMARY OF THE INVENTION

On the basis of this prior art, the object of an embodiment of the invention is to provide a method for saving the image data of a camera in an accident data recorder of a vehicle by considerably reducing the storage required for large volumes of data.

The above object can be achieved by a method having the features set forth herein.

Such a method for saving the image data of a camera in an accident data recorder of a vehicle is characterized by the following method steps:
a) performing object recognition by means of the image data,
b) compressing the image data by means of a lossy compression method,
c) saving the compressed image data and the object data of the objects identified from the image data in a storage unit in a predefined storage structure,
d) overwriting the data in the storage unit from a predefined volume of data, and
e) statically saving the compressed image data and the object data on the basis of a trigger signal.

By means of this method according to the invention the volume of incoming data for storage is reduced considerably, without the data required for reconstructing an accident being lost. By means of compression the image data are saved or stored in reduced form and thus there is a considerable minimization of the storage space, wherein only the object data of recognized objects are saved or stored completely. Due to the object data which are also recorded or stored, and from which the objects can be reconstructed, the compression can be increased so much that intermediate images do not need to be stored as well.

By means of a trigger signal the data is saved statically in the storage unit, so that said data cannot be overwritten, in order to reconstruct an accident scene with reference to this data for example.

In an advantageous manner according to one development only every n-th image of the image data is used for compressing the image data according to method step b). In this way only every n-th image is compressed and saved together with the object data without intermediate images between the n-th images. In this way it is possible to achieve a high degree of compression of the image data which only requires a small amount of storage space, without having to take into account losses in a later reconstruction of an accident scene.

According to one advantageous feature of the invention, in addition to the compressed image data and the object data, odometric data of the vehicle and its position data are saved. The advantage of this is that on reconstructing the accident scene the object data can be read from the storage unit and the accident scene can be visualized particularly well by means of a suitable method of synthetic image generation using the odometric data of the vehicle and its position data. Said odometric data of the vehicle and its position data are thus used to supplement the surroundings of the vehicle which are not captured by sensors.

According to one development, the object recognition comprises identifying moving objects in the vehicle's surroundings. Such moving objects are for example vehicles, bicycles, pedestrians, wheelchair users or animals. Furthermore, the object recognition preferably also comprises recognizing static objects in the vehicle's surroundings, for example driving lanes, traffic signs, construction work etc.

Preferably, it is appropriate to use a ring memory for the storage unit, in which the storage structure is predefined.

Furthermore, according to an advantageous development of the invention the trigger signal is generated by means of an airbag device, an emergency brake device and/or a sensor unit of the vehicle. Such a trigger signal is thus generated in connection with the triggering of an airbag, an emergency brake or reaching a predefined acceleration threshold of an acceleration sensor.

Alternatively, according to one development it is also possible that the trigger signal can be triggered manually by a passenger in the vehicle, wherein the triggered signal activates the saving of the data of the storage unit onto a mobile storage medium. In this way during the journey the triggering can be initiated by a driver or passenger of the vehicle, for example in order to record events which have already happened or which occur during the journey. A memory card can be used as a mobile storage medium.

The method according to the invention can be performed advantageously by means of an accident data recorder, which is equipped with an imaging camera, an object recognition unit, a compression unit, and a ring memory as a storage unit.

BRIEF DESCRIPTION OF THE DRAWINGS

The invention is explained in more detail in the following with reference to the accompanying Figures. In the latter.

DETAILED DESCRIPTION OF EXAMPLE EMBODIMENTS OF THE INVENTION

Figure 1:
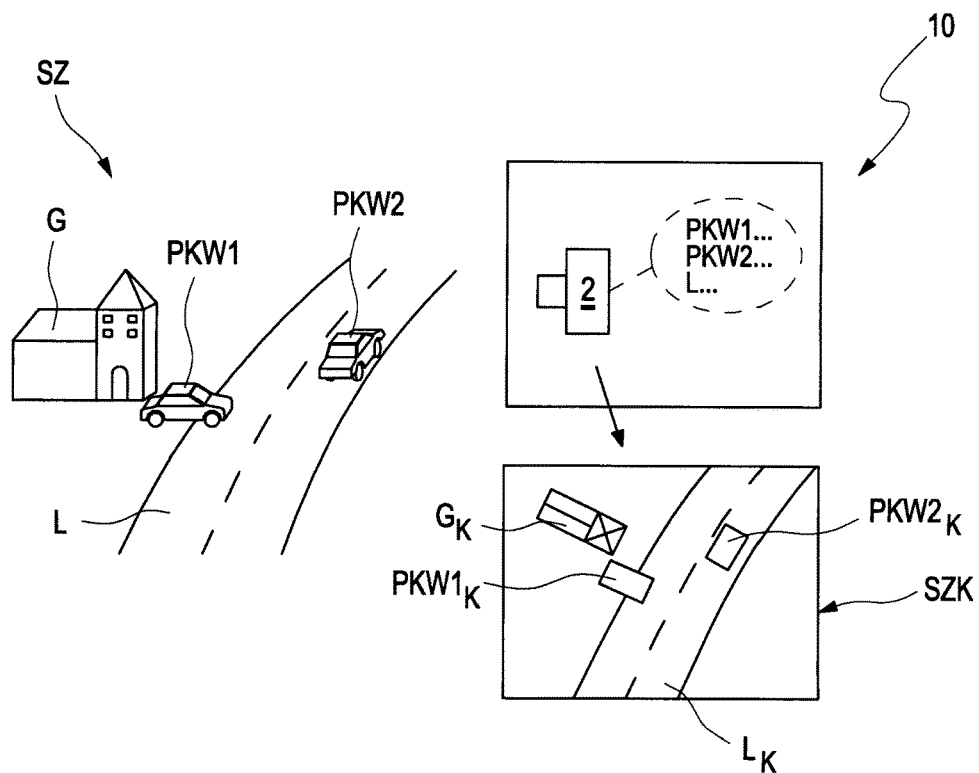
FIG. 1 shows a pictogram to explain the method according to the invention.

FIG. 1 shows by way of example a scenario SZ, as recorded by a camera 2 of an accident data recorder 10 of a vehicle (not shown). The structure of such an accident data recorder 10 is shown in FIG. 2.

Figure 2:
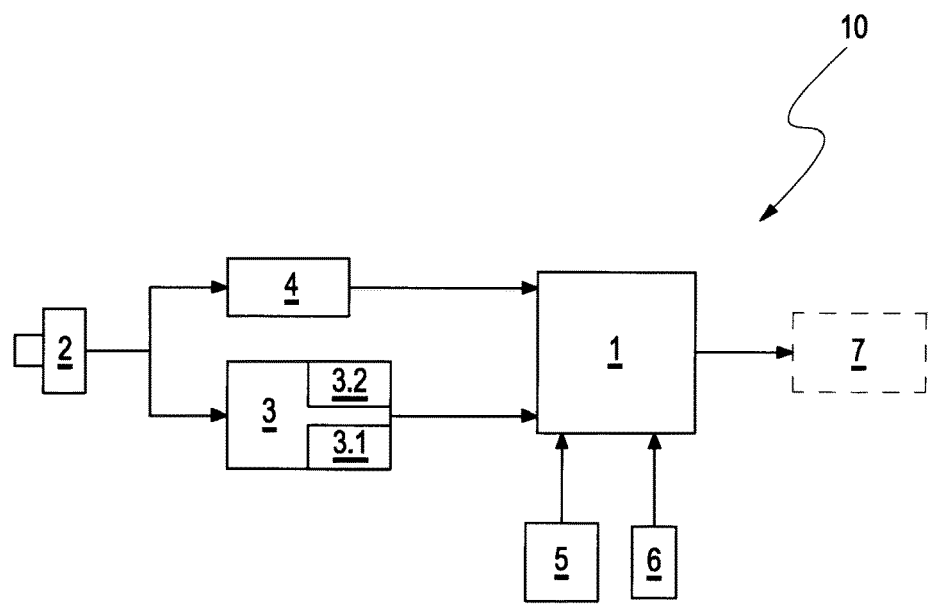
FIG. 2 shows a schematic block diagram of an accident data recorder for performing the method according to the invention.

According to FIG. 2 the image data produced by the camera 2, for example of the scenario SZ, are supplied both to an evaluation unit 3 as an object recognition unit and a compression unit 4. The output data of said object recognition unit 3 and the compression unit 4 are transferred to a ring memory 1 as a storage unit for recording. Furthermore, sensor signals of a vehicle sensor 5, for example an acceleration sensor, and position data of the vehicle of a GPS receiver 6, for example a navigation system, are supplied to said ring memory 1.

The image data of the scenario SZ recorded by the camera 2 are saved as raw data by the compression unit 4 in reduced form. Such compression methods are known. Thus for example only every n-th image is compressed and saved by means of such a compression method so that only a small amount of storage space is necessary for this.

Powerful algorithms 3.1 and 3.2 are installed in the object recognition unit 3 both for the object recognition of mobile objects, such as vehicles, bicycles, pedestrians, wheelchair users, animals or such as the vehicles Pkw1 and Pkw2 shown in the scenario SZ and also for the object recognition of static objects of the vehicle's surroundings, such as road signs, or the lanes L shown in the scenario SZ and construction in form of a building G.

By means of the object recognition unit 3 the mobile objects Pkw1, Pkw2 and the static objects L and G are identified and their object data is saved together with the compressed image data in the ring memory 1. As said objects are tracked over a plurality of image frames, their object data can be saved over a longer period, without additional storage space having to be taken up. In addition to this object data, the odometric data of the vehicle produced by the vehicle sensor 5 and the position data of the GPS receiver 6 are saved in the ring memory 1.

As shown schematically in FIG. 1, said object data can be read from the accident data recorder 10 and visualized by means of a suitable device for synthetic image generation as SZK scenario. In this case the saved position data of the vehicle and its odometric data are used to supplement the non-sensor detected static SZK scenario with objects $G_k$, $L_k$.

According to FIG. 1 in this reconstructed SZK scenario the vehicles $Pkw1_k$ and $Pkw2_k$ are also represented as mobile objects.

Data can be read from the ring memory 1 for example via a databus of the vehicle or via an on-board diagnostic interface.

The trigger for statically saving the data and thereby preventing the overwriting of the data in the non-volatile ring memory 1 is performed by generating a trigger signal, for example by a passive or active safety device, such as an airbag device, emergency brake device etc. and/or a sensor unit, for example an acceleration sensor of the vehicle. Thus for example the triggering of an airbag or emergency brake or exceeding a predefined acceleration threshold results in the generation of the trigger signal.

It is also possible to allow the trigger for statically saving the data in the ring memory 1 to be performed manually by a driver or a passenger of the vehicle, in order to record interesting events which have already happened during the journey. For this purpose the data could be read from the ring memory 1 and saved on a memory card 7, which could be removed by the driver after the journey for example.

The invention claimed is:

1. A method of saving data in an accident data recorder of a vehicle, comprising the following method steps:
    a) obtaining, from a camera of the vehicle, camera image data of a scene of surroundings of the vehicle,
    b) performing object recognition on the camera image data to identify objects in the surroundings from the camera image data and to produce object data of the objects that have been identified,
    c) compressing the camera image data by a lossy compression method to produce compressed image data,
    d) saving saved data, including odometric data and position data of the vehicle as well as the compressed image data and the object data, in a predefined storage structure in a storage unit,
    e) overwriting the saved data in the storage unit after reaching a predefined volume of the saved data in the storage unit,
    f) statically saving the saved data in response to a trigger signal, and
    g) reading out the object data, the odometric data and the position data that has been statically saved, and performing synthetic image generation based on at least the object data, the odometric data and the position data that has been read out, to generate synthesized images of the identified objects in a reconstructed scenario representing the scene.

2. The method according to claim 1, wherein the compressing of the camera image data comprises using only every n-th image of plural successive images of the camera image data.

3. The method according to claim 1, wherein the objects identified by the object recognition include moving objects in the surroundings of the vehicle.

4. The method according to claim 1, wherein the objects identified by the object recognition include static objects in the surroundings of the vehicle.

5. The method according to claim 1, wherein the storage unit comprises a ring memory.

6. The method according to claim 1, further comprising producing the trigger signal with an airbag device, an emergency brake device and/or a sensor unit of the vehicle.

7. The method according to claim 1, further comprising producing the trigger signal with a trigger device that is actuated manually by a passenger in the vehicle, and wherein the step of statically saving the saved data in response to the trigger signal comprises saving the saved data of the storage unit onto a mobile storage medium.

8. An accident data recorder for performing the method according to claim 1, comprising the camera configured and arranged to provide the camera image data, an object recognition unit configured and arranged to perform the object recognition, a compression unit configured and arranged to perform the compressing of the camera image data, and a ring memory as the storage unit.

9. The method according to claim 1, further comprising reading out the compressed image data that has been statically saved, wherein the synthetic image generation is performed further based on the compressed image data that has been read out.

10. A method comprising the steps:
   a) obtaining, from a camera of a vehicle, camera image data of a scene of surroundings of the vehicle;
   b) by performing object recognition on the camera image data, identifying objects in the surroundings from the camera image data and producing object data of the objects that have been identified;
   c) obtaining position data and odometric data of the vehicle;
   d) storing the object data, the position data and the odometric data;
   e) compressing the camera image data to produce compressed image data;
   f) storing the compressed image data; and
   g) reading out the object data, the position data and the odometric data that had been stored, and performing synthetic image generation based on at least the object data, the position data and the odometric data that has been read out, to generate synthesized images of the identified objects in a reconstructed scenario representing the scene.

11. The method according to claim 10, further comprising, before the step g), in response to a trigger signal statically saving the compressed image data and the object data that had been stored.

12. The method according to claim 10, wherein the identified objects include mobile objects selected from the group consisting of other vehicles, bicycles, pedestrians, wheelchair users and animals.

13. The method according to claim 10, wherein the identified objects include stationary objects selected from the group consisting of driving lanes, traffic signs, road signs, construction work and buildings.

14. The method according to claim 10, further comprising reading out the compressed image data that had been stored, wherein the synthetic image generation is performed further based on the compressed image data that has been read out.

* * * * *